(12) United States Patent
Ohki et al.

(10) Patent No.: US 6,510,672 B1
(45) Date of Patent: Jan. 28, 2003

(54) TUBULAR GRAPHITE BODY CAPABLE OF STORING HYDROGEN GAS AND ITS MANUFACTURING METHOD

(76) Inventors: Yoshimasa Ohki, 3-30-2, Oonodai, Sagamihara-shi, Kanagawa-ken (JP); Sohji Tsuchiya, 5-13-12, Wakabadai, Shiroyama-cho, Tsukui-gun, Kanagawa-ken (JP); Akira Taomoto, 54-10-306, Shiratoridai, Aoba-ku, Yokohama 227-0054 (JP)

( * ) Notice: Subject to any disclaimer, the term of this patent is extended or adjusted under 35 U.S.C. 154(b) by 0 days.

(21) Appl. No.: 09/575,366

(22) Filed: May 22, 2000

Related U.S. Application Data

(62) Division of application No. 09/171,000, filed on Oct. 14, 1998, now abandoned.

(30) Foreign Application Priority Data

Oct. 15, 1997 (JP) .............................................. 9-282321

(51) Int. Cl.$^7$ .............................................. B65B 31/02
(52) U.S. Cl. ........................ 53/432; 220/586; 220/582; 373/135
(58) Field of Search ................................. 220/586, 582; 219/390; 373/110, 111, 112, 135, 136; 432/18, 120; 53/432

(56) References Cited

U.S. PATENT DOCUMENTS 1,391,996 A * 9/1921 Collins ........................ 373/135
4,020,273 A * 4/1977 Dix et al. ........................ 13/7

OTHER PUBLICATIONS

"Science" magazine, "The World's Smallest Gas Cylinders?" by G. E Gadd et al., vol. 277, Aug. 15, 1997, pp. 933–936.*

* cited by examiner

*Primary Examiner*—Rinaldi I. Rada
*Assistant Examiner*—Thanh Truong

(57) ABSTRACT

Through a chemical vapor deposition process, a tubular graphite body is fabricated as a hydrogen storage element that comprises a tubular graphite body forming an elongated shell and at least one metal plug closing an open end of the elongated shell so as to form a closed inside space for storing hydrogen gas.

2 Claims, 2 Drawing Sheets

TUBULAR GRAPHITE BODY CAPABLE OF STORING HYDROGEN GAS AND ITS MANUFACTURING METHOD

This is a Division of application Ser. No. 09/171,000 filed Oct. 14, 1998 now abandoned.

BACKGROUND OF THE INVENTION

The present invention relates to a hydrogen storage element made of a complex substance chiefly containing carbon which is a light material for storing hydrogen gas, and also relates to a manufacturing method for fabricating the same.

Hydrogen gas is an excellent clean energy source because it produces no harmful emission, such as nitrogen oxide or carbonic acid gas, and is free from the so-called green house effect. Furthermore, in view of the difficulty in storing electric energy, surplus electric energy of night time is used for the electrolysis of water and stored in the form of hydrogen gas. Thus, hydrogen gas has an important role in the present and future energy cycle.

To realize a rapid and marvelous progress in the field of hydrogen utilizing technologies, such as hydrogen fuel cars, a key factor is to provide a safe and light hydrogen storing element and its manufacturing method.

SUMMARY OF THE INVENTION

An object of the present invention is to provide a safe, light-weight, easily portable, and low-pressure hydrogen storing element and its manufacturing method.

In order to accomplish the above and other related objects, one aspect of the present invention provides a hydrogen storage element comprising a tubular graphite body forming an elongated shell of the hydrogen storage element, at least one metal plug closing an open end of the elongated shell so as to form a closed inside space for storing hydrogen gas.

Preferably, the closed inside space is partitioned into a plurality of independent spaces by metal particles.

To obtain excellent hydrogen storage capability, it is preferable that the closed inside space has a diameter in a range from 0.2 nm to 100 nm and a length in a range from 100 nm to 100 $\mu$m.

Preferably, the metal plug contains a metallic component selected from the group consisting of nickel, cobalt, iron, palladium and their alloys, because the hydrogen gas can easily penetrate these metal materials and these metal materials can be firmly connected to the carbon of the tubular graphite body.

Preferably, the tubular graphite body is multilayered graphite sheets forming a cup-shaped shell having an open end closed by the metal plug.

Another aspect of the present invention provides a manufacturing method of a hydrogen storage element comprising the steps of placing a material of a metal-containing compound in a closed chamber, and heating the material so that the evaporate material decomposes at a selected temperature in a range from 550° C. to 950° C., thereby forming a tubular graphite body.

Preferably, the metal contained in the material is selected from the group consisting of nickel, cobalt, iron, palladium and their alloys.

Preferably, the closed chamber is vacuumized, or filled with an inert or reducing gas.

Another aspect of the present invention provides a manufacturing method of a hydrogen storage element comprising the steps of putting a material of a metal-containing compound in a quartz boat, placing the quartz boat in a quartz reaction tube having an open end, airtightly closing the open end of the quartz reaction tube and vacuumizing an inside space of the quartz reaction tube, and heating the material so that evaporate material decomposes at a selected temperature in a range from 550° C. to 950° C., thereby forming an elongated tubular graphite body with one end closed by a metallic plug.

Preferably, a first heating device is provided for evaporating the material and a second heating device is provided for decomposing the evaporated material, and the first and second heating devices are arranged in a row along an elongated body of the quartz reaction tube.

Preferably, the quartz boat is placed at a portion corresponding to the first heating device. The second heating device preheats the quartz reaction tube at a portion offset from the quartz boat at the selected temperature before the first heating device is activated to heat the material.

Another aspect of the present invention provides a manufacturing method of a hydrogen storage element comprising the steps of placing a material of a metal-containing compound in a closed chamber, heating the material so that evaporate material decomposes at a selected temperature in a range from 550° C. to 950° C., thereby fabricating a tubular graphite body, and mechanically cracking the fabricated tubular graphite body.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferable embodiment of the present invention will be explained in more detail with reference to FIGS. 1 and 2.

Figure 1:
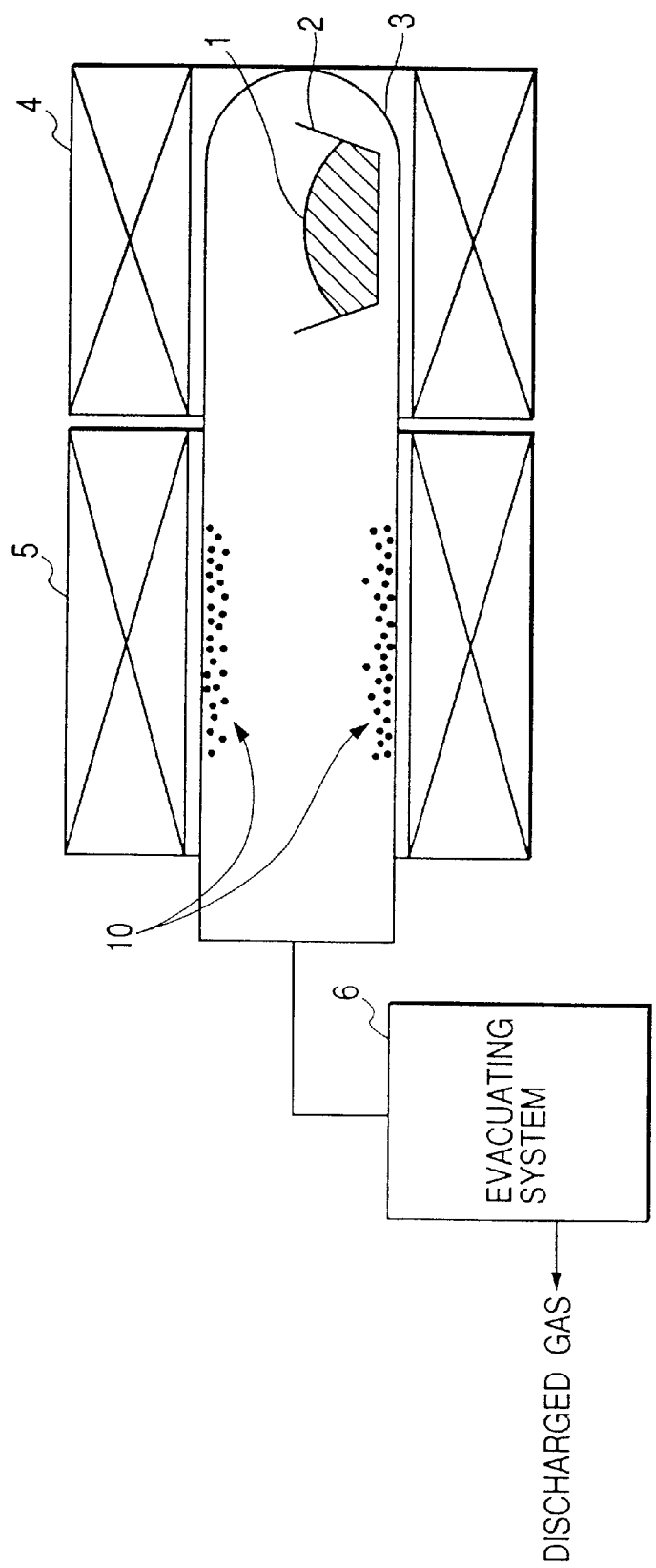
FIG. 1 is a cross-sectional view showing a manufacturing apparatus of a hydrogen storage element in accordance with a preferred embodiment of the present invention.

FIG. 1 is a schematic view showing a manufacturing apparatus of a hydrogen storage element in accordance with a preferred embodiment of the present invention. First, Ni(nickel)-phthalocyanine powder 1 is prepared as a source material of the hydrogen storage element. The Ni-phthalocyanine powder 1 is put in a quartz boat 2. An elongated quartz reaction tube 3, having an open end and a closed end, is prepared. The quartz boat 2 accommodating or storing Ni-phthalocyanine powder 1 is entered into this elongated quartz reaction tube 3 from its open end and placed at an inner end closer to the opposite closed end. Then, the open end of the elongated quartz reaction tube 3 is airtightly closed by a sealing plate. An evacuating system 6 is connected to the quartz reaction tube 3. The inside space in the quartz reaction tube 3 is then vacuumized by the evacuating system 6.

An electric furnace 4 is provided for heating the material and another electric furnace 5 is provided for promoting thermal decomposition of the evaporated material. These electric furnaces 4 and 5, each surrounding the elongated body of the quartz reaction tube 3, are arranged in a row in the axial direction of the quartz reaction tube 3.

While the inside space of the quartz reaction tube 3 is kept vacuum by the evacuating system 6, the quartz reaction tube 3 is heated by the electric furnaces 4 and 5. More specifically, in response to activation of the thermal decomposition furnace 5, the temperature of the central portion of the quartz reaction tube 3 increases to 800° C. After the temperature of the central portion of the quartz reaction tube 3 is stabilized, the material heating furnace 4 starts heating the Ni-phthalocyanine powder 1 at 400° C.

When heated at 400° C., the Ni-phthalocyanine powder 1 evaporates and diffuses toward the central portion of the quartz reaction tube 3. When the diffused material arrives at the central portion of the quartz reaction tube 3, the material starts thermally decomposing in a high-temperature environment as the central portion of the quartz reaction tube 3 is kept at 800° C. This thermal decomposition forms particles of separated or isolated metal (i.e., Ni). The Ni particles act as a catalytic agent for transforming the carbon into a tubular graphite body.

Through the above-described chemical vapor deposition process, fiber substances, approximately 0.3 $\mu$m in diameter and 100 $\mu$m in length, were formed as growth deposition on the inside wall of the quartz reaction tube 3 after a one hour reaction. This fiber substance was identified as a tubular graphite body containing Ni particles based on an appropriate verification, such as Raman scattering measurement, X-ray diffraction measurement, or electronic microscopic monitoring.

More specifically, the fabricated fiber substance, acting as the hydrogen storage element, has a cylindrical graphite sheet body consisting of a netlike 6-member rings of carbon atoms with an end containing 5-member rings of the carbon atom or closed by a metallic particle. Regarding this kind of fiber substances, an argon-confining graphite nano-tube is reported in "Science," vol. 277, page 933, published Aug. 15, 1997.

Figure 2:
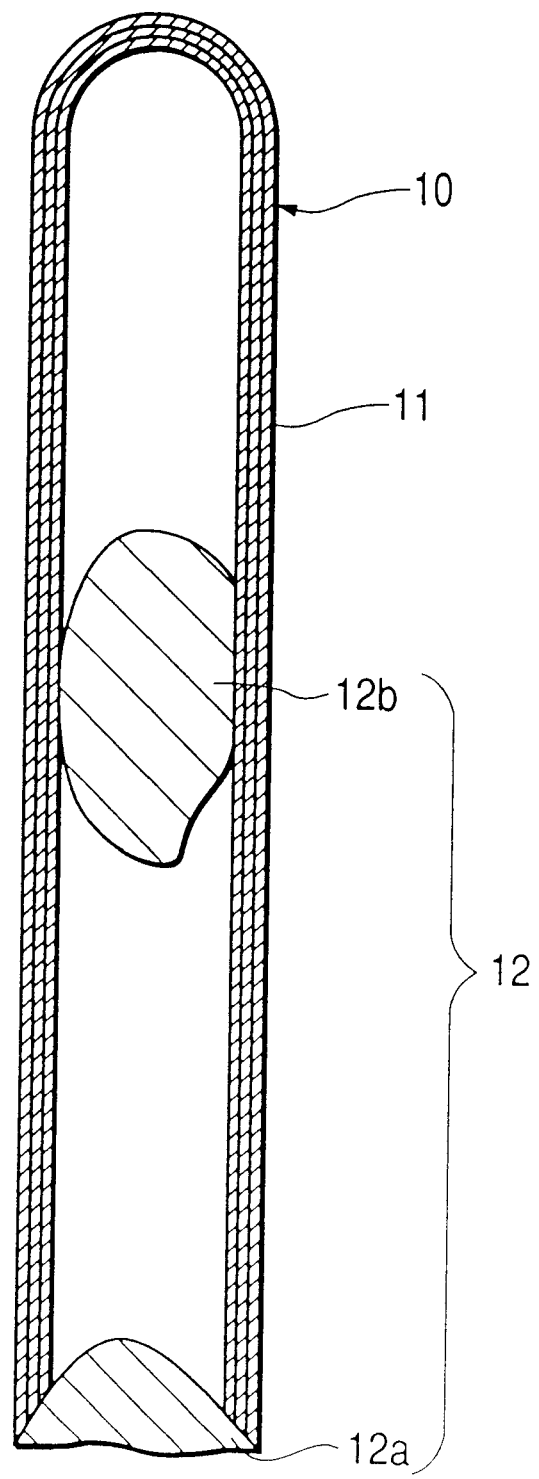
FIG. 2 is a cross-sectional view showing a typical arrangement of a tubular graphite body fabricated by the manufacturing apparatus of FIG. 1.

FIG. 2 is a cross-sectional view showing a typical arrangement of the tubular graphite body 10 fabricated through the above-described manufacturing method explained with reference to FIG. 1.

The tubular graphite body 10 comprises multilayered graphite sheets 11 forming a cup-shaped shell having an open end closed by a plug of a conical Ni particle 12a. An imperfect ellipsoidal Ni particle 12b is confined in the cup-shaped shell of the multilayered graphite sheets 11. Although FIG. 2 shows only one confined Ni particle 12b, a practical tubular graphite body will include a plurality of confined Ni particles 12b that substantially partition the elongated tubular inside space into a plurality of independent and short closed spaces.

Hydrogen storage capability of the fabricated tubular graphite body 10 was checked by an occluded hydrogen measuring device. As a result, it was confirmed that the fabricated tubular graphite body 10 has satisfactory capability of storing hydrogen at 200° C.

More specifically, a test sample of the fabricated tubular graphite body 10 is placed in a container having a known volume and left for 1,000 seconds in a hydrogen atmosphere of 10 atm. and 200° C. Next, the temperature is reduced to a room temperature, while the pressure is maintained at the same value. Subsequently, the hydrogen gas is completely discharged from the container. And, the inside space of the container is vacuumized. The temperature is again increased to 200° C. At this moment, the pressure in the container was substantially increased due to the presence of certain gas. According to a later conducted mass spectrometry, it was confirmed that the hydrogen gas was released from the tubular graphite body 10. According to the increased pressure of the container, it was assumed that the hydrogen gas of approximately 3 atm. pressure was confined in the tubular graphite body 10.

As apparent from the foregoing description, the above-described embodiment provides a method for manufacturing a hydrogen storage element of a tubular graphite body by using the Ni-phthalocyanine powder. According to this manufacturing method, the metal-containing material evaporates and thermally decomposes in the vacuum atmosphere of 800° C. to form the hydrogen storage element of the tubular graphite body having an end closed by a Ni particle.

To obtain satisfactory hydrogen storage effects, it was confirmed based on experiments conducted by the inventors that a preferable size of the tubular graphite body is in a range from 0.2 nm to 100 nm in diameter and in a range from 100 nm to 100 $\mu$m in length.

To confirm the capability of forming the above-described tubular graphite body, the inventors of the present invention have tested the above-described manufacturing method on various organic compounds containing metal components other than Ni (nickel). From the conducted tests, it was confirmed that Fe (iron), Co (cobalt) and Pd (palladium) are preferable metals to be added in the material for forming the tubular graphite body of the present invention.

A preferable temperature for the thermal decomposition is in a range from 550° C. to 950° C.: more specifically, from 550° C. to 750° C. for Fe; from 600° C. to 850° C. for Ni; from 650° C. to 950° C. for Co; and from 600° C. to 900° C. for Pd.

Furthermore, it is preferable that the environment of the material is kept in a vacuum during the reaction. However, inert gas or reducing gas can be used as a reaction environment for the material.

Regarding the effect of hydrogen occlusion, each of the tested substances has demonstrated a preferable result comparable with that of the Ni-containing material. When cobalt is used, the hydrogen occlusion amount is relatively smaller and the required reaction temperature is relatively higher. When palladium is used, the hydrogen occlusion is relatively larger and the required reaction temperature is relatively lower. Furthermore, when a mixture of Pd-containing compound and Ni-containing compound is used, a resultant tubular graphite body contains Pd—Ni alloy particles and demonstrates intermediate hydrogen occlusion characteristics somewhere between that of the Pd-containing compound and that of the Ni-containing compound. In other words, the present invention can be realized by using an alloy.

Furthermore, the inventors of the present invention have tested the effect of cracking the tubular graphite body. More specifically, the manufactured tubular graphite body was mechanically cracked in a mortar. Then, the hydrogen occlusion amount was measured in the same manner as in the above-described measuring process. The measured occluded hydrogen amount was approximately 3 atm. which is identical with the data of the non-cracked tubular graphite body. However, the effect of cracking the tubular graphite body was recognized in that a total time required for occlusion was 600 seconds, which is shorter than 1,000 seconds of the non-cracked tubular graphite body.

When the elongated tubular graphite body is partitioned by Ni particles into a plurality of isolated spaces, the hydrogen gas needs to sequentially penetrate the obstacles of Ni particles to diffuse entirely in an inner space of the tubular graphite body and therefore it takes a long time to reach an equilibrium pressure. However, by cracking the elongated body, the tubular graphite body is separated into short tubular bodies each containing a smaller number of Ni particles. This is effective to increase the occlusion speed of the hydrogen gas.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall Within the metes and bounds of the claims, or equivalents of such metes and bounds, are therefore intended to be embraced by the claims.

What is claimed is:

1. A manufacturing method of a hydrogen storage element comprising the steps of:

placing a material of a metal-containing compound in a closed chamber;

heating said material so that evaporate material decomposes at a selected temperature in a range from 550° C. to 950° C., thereby fabricating a tubular graphite body; and mechanically cracking the fabricated tubular graphite body.

2. A manufacturing method of a hydrogen storage element comprising the steps of:

putting a material of a metal-containing compound in a quartz boat;

placing said quartz boat in a quartz reaction tube having an open end;

airtightly closing said open end of said quartz reaction tube and vacuumizing an inside space of said quartz reaction tube; and heating said material so that evaporate material decomposes at a selected temperature in a range from 500° C. to 950° C., thereby forming an elongated tubular graphite body with one end closed by a metallic plug, wherein (1) a first heating device is provided for evaporating said material and a second heating device is provided for decomposing the evaporated material, (2) said first and second heating devices are arranged in a row along an elongated body of said quartz reaction tube, and (3) said second heating device preheats said quartz reaction tube at a portion offset from said quartz boat at said selected temperature before the first heating device is activated to heat said material.

* * * * *

UNITED STATES PATENT AND TRADEMARK OFFICE
CERTIFICATE OF CORRECTION

PATENT NO.    : 6,510,672 B1                                                Page 1 of 1
DATED         : January 28, 2003
INVENTOR(S)   : Yoshimasa Ohki et al.

It is certified that error appears in the above-identified patent and that said Letters Patent is hereby corrected as shown below:

<u>Title page,</u>
Change Item "76" to Item -- 75 --
After "[76]" insert -- [73] Assignee: Matsushita Electric Industrial Co., Ltd., and Japan Science and Technology Corp., both of Japan -- and
After "*Assistant Examiner*" insert -- *Attorney, Agent, or Firm,* Parkhurst and Wendel, L.L.P. --.

Signed and Sealed this

Tenth Day of June, 2003

JAMES E. ROGAN
*Director of the United States Patent and Trademark Office*